Nov. 22, 1955  J. M. MURPHY  2,724,577
AUTOMATICALLY CONTROLLED REFRIGERATING
APPARATUS WITH HEATING MEANS
Filed July 8, 1952
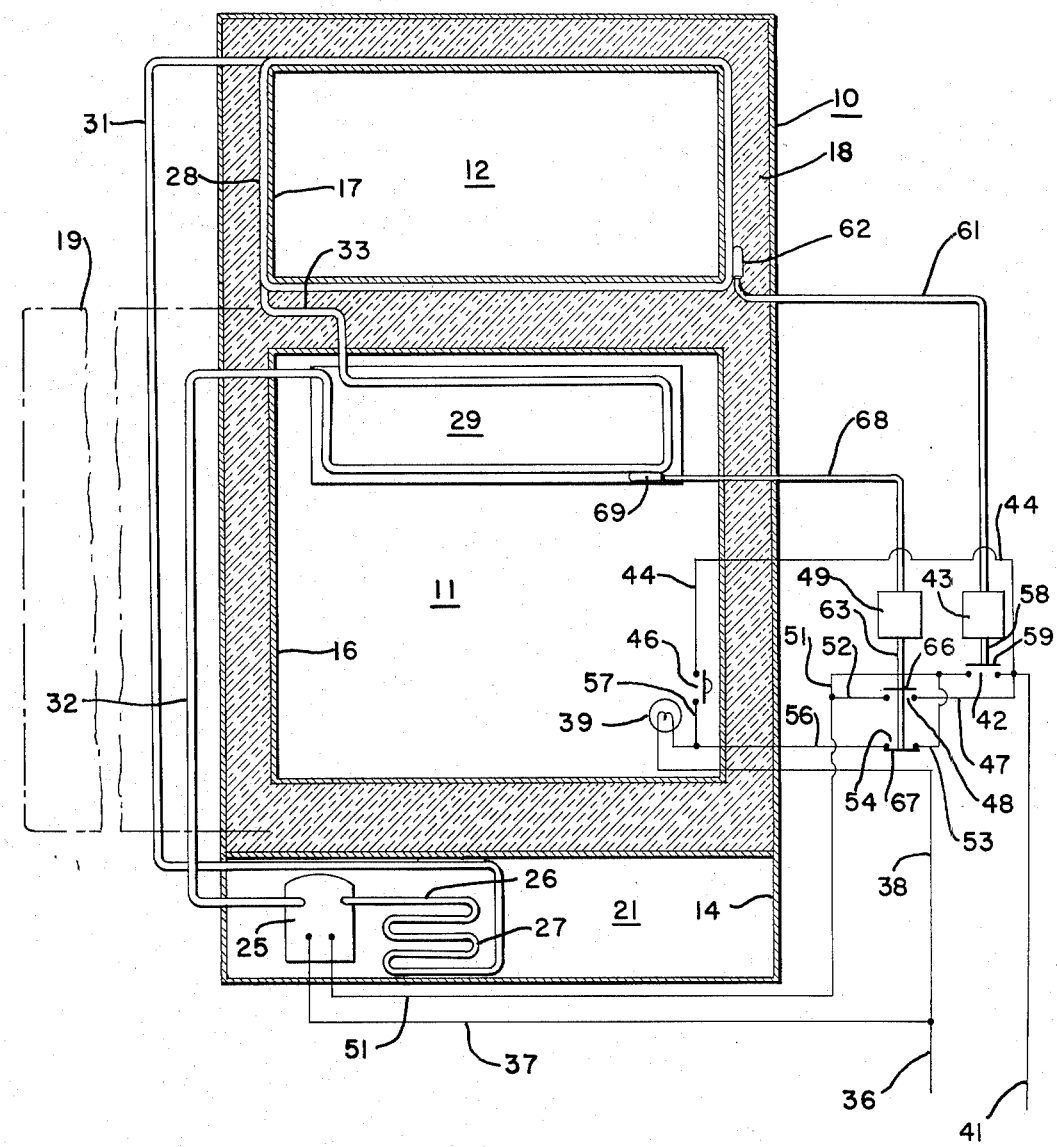
INVENTOR.
John. M. Murphy.
BY
Willits, Hardman & Fehr.

United States Patent Office 2,724,577
Patented Nov. 22, 1955

2,724,577

AUTOMATICALLY CONTROLLED REFRIGERATING APPARATUS WITH HEATING MEANS

John M. Murphy, Oakwood, Ohio, assignor to General Motors Corporation, Dayton, Ohio, a corporation of Delaware Application July 8, 1952, Serial No. 297,639

1 Claim. (Cl. 257—3)

This invention relates to refrigeration and particularly to the control of a refrigerating system associated with a refrigerator cabinet.

It has long been a problem to provide a satisfactory control system for mechanically refrigerated refrigerators, particularly of the household type, which may be manufactured in large quantities, distributed and used throughout areas of widely varying atmospheric conditions in this and other countries. This problem presents itself because of the fact that a control system must be provided to operate the refrigerating system of the refrigerator in varying atmospheric temperatures ranging below freezing to above 100° F. The advent of household refrigerators having a freezing or frozen food storage compartment separately insulated from a main higher temperatured food storage compartment has increased the importance of overcoming the aforesaid problem. My invention is particularly directed to a control system for a refrigerator of this type wherein the proper or desired differential temperatures are produced in the two separate compartments of the refrigerator cabinet irrespective of ambient temperatures exteriorly of the cabinet.

An object of my invention is to provide a control system for a refrigerator to maintain the desired below-freezing temperature in the frozen food compartment thereof when the ambient temperatures are such as to require no refrigeration in the higher temperatured food storage compartment of the cabinet.

Another object of my invention is to provide a control system for a refrigeration system of a two temperatured refrigerator cabinet which will cause refrigeration to be produced in both compartments at normal room temperatures, refrigeration in the low temperature compartment when the ambient temperature outside the cabinet is below that normally maintained in the higher temperatured food storage compartment and to warm the interior of the latter compartment to prevent freezing of perishable food products stored therein as a result of such low ambient temperature.

A further object of my invention is to provide control means for a refrigeration system of the aforesaid type in which a lamp used for illuminating the high temperatured cooling compartment, when its door is opened for access to the contents thereof, is utilized to heat the cooling compartment to prevent freezing of perishable products therein while a demand for refrigeration exists in the frozen food compartment and which lamp may be rendered ineffective when a demand for refrigeration occurs in the cooling compartment irrespective of ambient temperatures or the temperature within the frozen food compartment.

In carrying out the foregoing objects, it is a still further and more specific object of my invention to provide a control system which may be adjusted and set at the factory to maintain a predetermined desired temperature in each of two compartments of a refrigerator and needs no further adjusting and setting after the refrigerator has been shipped out of the factory and installed in areas differing in atmospheric condition to thereby render the refrigerator universal in use in various ambient temperature zones.

Further objects and advantages of the present invention will be apparent from the following description, reference being had to the accompanying drawings, wherein a preferred form of the present invention is clearly shown.

The figure in the drawing is a diagrammatic view of a refrigerating system embodying the invention.

Referring to the drawing, for illustrating my invention, I show a household refrigerator cabinet, generally represented by the reference character 10, of the type having a lower cooling or unfrozen food compartment 11 and a separate upper freezing or frozen food storage compartment 12 therein. The cabinet outer shell or walls 14 are spaced from metal liners 16 and 17, forming the compartments 11 and 12 respectively, and any suitable or desirable insulating material 18 is placed around the liners for insulating the cabinet and insulating the compartments from each other. Separate doors are provided for each of the compartments 11 and 12 and the door for compartment 11 is shown in open position at 19 by the dot-dash lines. The outer walls 14 of cabinet 10 depend below the compartment 11 and form a machine compartment 21 in the lower portion of the cabinet.

A closed refrigerating system and an electric circuit is associated with cabinet 10. The refrigerating system includes a refrigerant translating or liquifying device comprising a motor and a compressor driven thereby both of which are housed in the motor-compressor unit 25. Unit 25 is located in the machine compartment 21 and is connected, by a conduit 26, with a condenser 27 also located within this compartment. A refrigerant evaporator, in the form of a conduit coil 28 wrapping around liner 17, cools the interior of compartment 12 to a temperature below freezing such, for example, as between 0° and 10° F. A sheet metal plate type evaporator 29 is located within compartment 11 and is adapted to cool the interior of this compartment to a temperature above freezing such, for example, as between 40° and 50° F. A conduit 31 connects the condenser 27 to evaporator 28 and a conduit 32 connects the evaporator 29 with the compressor within unit 25. The two evaporators 28 and 29 are connected in series flow relationship by a conduit 33. This conduit 33 may be of a suitable diameter to restrict the flow of refrigerant from evaporator 28 into evaporator 29 so as to deliver refrigerant from the discharge side of evaporator 28 at one pressure and into evaporator 29 at a lower pressure. The flow of refrigerant from condenser 27 into evaporator 28 may be restricted by a capillary tube or controlled by an expansion valve as desired. Operation of the compressor by the motor within unit 25 draws evaporated refrigerant from the evaporators 28 and 29 through conduit 32 and compresses this vaporous refrigerant. The compressed refrigerant is discharged from unit 25 into condenser 27, by way of conduit 26, where it is cooled and liquified in the well-known manner. Liquid refrigerant is circulated to evaporator 28 through conduit 31 and enters this evaporator for absorbing and removing heat from compartment 12. Refrigerant flowing from evaporator 28 to evaporator 29 causes evaporator 29 to remove heat from the compartment 11. In this manner, the aforesaid temperatures are normally maintained within the compartments 11 and 12 under suitable controls to be presently described. The electric circuit and controls therein for controlling the refrigerating system associated with the refrigerator cabinet 10 will now be described. The one power line 36 has a branch wire 37 leading to the motor of the motor-compressor unit 25 and has another branch wire 38 leading to an electric lamp 39 disposed within the cooling compartment 11. Lamp 39 is utilized in the present invention to both illuminate the compartment 11 and to apply artificial heat thereto. The other power line 41 leads to one contact on an electric switch 42 controlled by a first thermostatic means 43. This line 41 has a branch wire 44 leading to one contact on a spring tensioned door operated electric switch 46 and another branch wire 47 leading to one contact of an electric switch 48 controlled by a second thermostatic means 49. The other contact on electric switch 42 has a wire 51 leading therefrom to the motor of the motor-compressor unit 25. Wire 51 has a branch wire 52 connected to the other contact on electric switch 48. A wire 53 connects wire 51 to one contact on an electric switch 54 also actuated, simultaneously with the actuation of electric switch 48, by the second thermostatic means 49. The other contact on electric switch 54 is connected to the lamp 39 by a wire 56 which is provided with a branch wire 57 connected to the other contact on the door actuated switch 46. The thermostatic means 43 may be of any suitable or conventional construction and preferably includes an expansible and contractable bellows for operating a snap switch mechanism (not shown) to move a rod or the like 58 connected therewith and which rod carries a suitable plate 59 for bridging the set of contacts of electric switch 42. The bellows in thermostatic means 43 has a tube 61 sealed thereto and this tube has a bulb 62 sealed to its other end. Bulb 62 is mounted in thermal contact with evaporator 28. The bellows of thermostatic means 43, its tube 61 and bulb 62 is charged with a suitable volatile fluid and form a thermal responsive power unit for operating the switch mechanism portion of the means 43 and consequently electric switch 42. Thermostatic means 49 may also include an expansible and contractable bellows for operating a switch mechanism (not shown) to move a rod or the like 63 connected therewith and which rod carries two spaced apart plates 66 and 67 for bridging the contacts of electric switch 48 and of electric switch 54 respectively. The bellows in thermostatic means 49 has a tube 68 sealed thereto and this tube has a bulb 69 sealed to its other end. Bulb 69 is mounted on the plate type evaporator 29 within compartment 11. The bellows in thermostatic means 49, its tube 68 and bulb 69 are also charged with a volatile fluid and form a thermal responsive power unit for operating the switch mechanism portion of the means 49 and consequently simultaneous operation of the electric switches 48 and 54.

When the apparatus herein disclosed is first placed into operation the electric switches 42 and 48, of the thermostatic means 43 and 49 respectively, will be closed and the electric switch 54, of the thermostatic means 49, will be open. Thus either or both thermostatic means 43 and 49 start the motor of the motor-compressor unit 25 in operation and since electric switch 54 is open lamp 39 is deenergized. The motor drives the compressor of the refrigerating system to produce the aforesaid different temperatures in compartments 11 and 12. After the desired temperatures have been attained in the compartments 11 and 12 the thermostatic means causes the electric switches 42, 48 and 54 to assume the position shown in the drawing. That is, switches 42 and 48 will be open to break the electric circuits leading to the motor of unit 25 and switch 54 will be closed readying lamp 39 for energization should switch 42 be subsequently closed. Electric current may flow to lamp 39 at any time door 19 of compartment 11 is opened independently or irrespective of the position of the electric switch 42, controlled by the thermostatic means 43, to cause the door operated switch 46 to close. Thus if door 19 is opened the spring tensioned contact bridging plate on switch 46 will complete the circuit through lamp 39 by way of power line 36, branch wire 38, branch wire 57, door switch 46, branch wire 44 to the other power line 41. Let us assume that the motor and compressor of unit 25 are idle and the controls are in the position shown in the drawing. Suppose now that the temperature of the frozen food compartment 12 rises above its predetermined maximum temperature of 10° F. then thermostatic means 43 will move rod 58 to close the bridging plate 59 upon the contacts of electric switch 42. This closing of switch 42 completes two parallel electric circuits to both energize lamp 39 and to simultaneously and/or instantaneously start operation of the motor of the motor-compressor unit 25. The one circuit for energizing lamp 39 includes power line 41, wire 53, closed switch 54, wire 56 and wire 38 leading back to the other power line 36. The other circuit for starting the motor of unit 25 includes power line 41, closed switch 42, wire 51 and wire 37 leading back to the power line 36. As the motor of unit 25 operates the compressor of the refrigerating system, lamp 39 generates and applies artificial heat to the interior of compartment 11. When the temperature of evaporator 28 or the temperature within the freezing compartment 12 has been reduced to within the predetermined range of temperature designated to be maintained therein thermostatic means 43 will cause opening of switch 42 which stops the operation of the motor of unit 25 and deenergizes lamp 39. At this time it is possible that sufficient artificial heat may have been dissipated, by lamp 39, to the cooling compartment 11 to have already caused thermostatic means 49 to close switch 48 and open switch 54. In such case the thermostatic means 49 causes continued or further operation of the motor-compressor unit 25 and simultaneous deenergization of lamp 39 by completing another circuit to the motor of unit 25 so as to reduce the temperature within cooling compartment 11 to within its desired predetermined limits and by opening the circuit controlled by switch 54 for the lamp. The circuit to the motor of unit 25, completed by closing switch 48, is by way of power line 36 and its branch wire 37 on the one side of the line and by way of power line 41, branch wire 47, switch 48, wire 52 and wire 51 on the other side of the line. Thus it should be noted that the control means of the present invention is responsive to an increase in temperature of either of the compartments 11 or 12 independently of one another to start the motor-compressor unit in operation irrespective of ambient temperatures outside the refrigerator 10. My improved control system for the refrigerator 10 maintains a different predetermined temperature range in each of the compartments 11 and 12 and a substantially uniform differential temperature between these compartments under various and practically all conditions of atmospheric temperatures. In view of the foregoing it is believed to be obvious to one skilled in the art that my control system will function automatically to maintain the specified temperature limits in compartments 11 and 12 and a predetermined temperature differential therebetween in a room of 70° to 100° F. In addition to this, however, my control system also causes artificial heat to be imparted or applied to the interior of the cooling compartment 11 when the ambient temperature outside cabinet falls below the minimum predetermined temperature limit in compartment 11 to thereby prevent freezing of perishable food products stored therein. For example, should the refrigerator 10 be located on a porch or the like where lower temperature exists and no refrigeration is required in compartment 11 such as when the ambient temperature falls below 40° F. or even below freezing, any increase in temperature within the frozen food compartment 12 above 10° F. will cause thermostatic means 43 to respond to this increased temperature. Under this condition thermostatic means 43 will move rod 58 and plate 59 thereon into bridging engagement with the contacts of electric switch 42. Thus an electric circuit is completed to lamp 39 to energize same and to the electric motor in unit 25 to start operation of the motor and consequently the compressor of the refrigeration system. During the existence of the low ambient temperature, the refrigerating system functions periodically to maintain the prescribed temperature in freezing compartment 12 and to cause lamp 39 to apply artificial heat to the interior of cooling compartment 11 to thereby warm this compartment and prevent perishable food products stored therein from freezing. It will be noted, therefore, that either thermostatic means may become effective independently of one another for starting the motor of the motor-compressor unit 25, that thermostatic means 49 deenergizes the lamp 39 when a demand for refrigeration in compartment 11 occurs and that lamp 39 is energized independently of either thermostatic means 43 or 49 in response to movement of door 19 into open position. My invention is distinguished from prior control systems in that the motor of the motor-compressor unit 25 is directly connected across the power lines 36 and 41 to start operation thereof immediately upon closing or instantaneously with closing switch 42 of thermostatic means 43 rather than waiting until lamp 39 has generated sufficient heat in compartment 11 to cause thermostatic means 49 to respond to the increase in temperature of compartment 11. Such a delay in the starting of the motor of the refrigerating system materially affects the temperature differential between the food storage compartments and my invention particularly overcomes this problem.

From the foregoing it should be apparent that I have provided an improved and novel control for a refrigerating system which renders the refrigerator, with which the system is associated, capable of installation and efficient operation in widely varying atmospheric conditions of temperatures. The refrigeration system is entirely automatic irrespective of ambient temperatures outside the cabinet to maintain the predetermined temperature ranges in the two different refrigerated food storage compartments of the refrigerator cabinet and to maintain a more uniform temperature differential between these compartments.

While the form of embodiment of the invention as herein disclosed constitutes a preferred form, it is to be understood that other forms might be adopted, as may come within the scope of the claim which follows.

What is claimed is as follows:

A refrigerating apparatus comprising, a cabinet having an unfrozen food storage compartment and a frozen food storage compartment therein, a closed refrigerating system associated with said cabinet including an evaporator for said frozen food compartment, another evaporator for said unfrozen food compartment, a motor and a compressor driven thereby and conduits connecting said evaporators in series flow relationship whereby said compressor at all times circulates refrigerant through said evaporators in succession to produce differential temperatures within said compartments, means adapted to apply artificial heat within said unfrozen food compartment, a power source, circuit means for supplying power from said source to said heat applying means and to said motor, a first switch in said circuit means, means responsive to an increase in temperature of the frozen food compartment evaporator above a predetermined value for closing said first switch to start said motor, said circuit means including a branch line having a second switch in series with said first switch for connecting said heat applying means to said power source, said circuit means also including a by-pass line having a third switch therein for by-passing current from said power source around said first switch to start said motor, means responsive to a predetermined increase in temperature of the unfrozen food compartment evaporator for opening said second switch and closing said third switch, and said heat applying means being energized only while said second switch is closed and when said first switch closes whereby said motor and said heat applying means are connected in parallel with said power source.

References Cited in the file of this patent
UNITED STATES PATENTS

| | | |
|---|---|---|
| 2,462,240 | Vliet et al. | Feb. 22, 1949 |
| 2,485,894 | Kuhn | Oct. 25, 1949 |
| 2,488,161 | Benson et al. | Nov. 15, 1949 |
| 2,622,405 | Grimshaw | Dec. 23, 1952 |